(12) United States Patent
Zhao et al.

(10) Patent No.: US 10,135,939 B2
(45) Date of Patent: Nov. 20, 2018

(54) METHOD AND APPARATUS FOR SENDING DELIVERY NOTIFICATION OF NETWORK APPLICATION-RELATED PRODUCT

(71) Applicant: TENCENT TECHNOLOGY (SHENZHEN) COMPANY LIMITED, Shenzhen (CN)

(72) Inventors: Mingming Zhao, Shenzhen (CN); Ningguo Chen, Shenzhen (CN); Jianwei Deng, Shenzhen (CN); Ding Zhang, Shenzhen (CN); Chaofan Zhou, Shenzhen (CN); Qiang Fei, Shenzhen (CN); Songjian Wang, Shenzhen (CN); Peng Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 293 days.

(21) Appl. No.: 14/795,326

(22) Filed: Jul. 9, 2015

(65) Prior Publication Data

US 2015/0312362 A1   Oct. 29, 2015

Related U.S. Application Data (63) Continuation of application No. PCT/CN2014/070592, filed on Jan. 14, 2014.

(30) Foreign Application Priority Data

Jan. 14, 2013   (CN) .......................... 2013 1 0012743

(51) Int. Cl.
*H04L 29/08* (2006.01)
*H04L 12/26* (2006.01)
(Continued)

(52) U.S. Cl.
CPC .......... *H04L 67/26* (2013.01); *H04L 41/5009* (2013.01); *H04L 41/5025* (2013.01);
(Continued)

(58) Field of Classification Search
CPC . H04L 67/26; H04L 41/5009; H04L 41/5025; H04L 43/087; H04L 65/80;
(Continued)

(56) References Cited

U.S. PATENT DOCUMENTS 7,995,464 B1 * 8/2011 Croak ................. H04L 41/5009
370/218
8,289,845 B1 * 10/2012 Baldonado .............. H04L 43/16
370/229
(Continued)

FOREIGN PATENT DOCUMENTS

| CN | 101097625 | 1/2008 |
| CN | 102737341 A | 10/2012 |

(Continued)

OTHER PUBLICATIONS

Chinese Office Action dated Nov. 3, 2016.

*Primary Examiner* — Wing F Chan
*Assistant Examiner* — Billy H Ng
(74) *Attorney, Agent, or Firm* — Sughrue Mion, PLLC (57) ABSTRACT

A method and apparatus for sending a delivery notification of a network application-related product are provided. The method includes: selecting a delivery executing server in advance from multiple delivery servers of an application; acquiring quality of service information of the delivery executing server of the application; judging, according to a predefined judging rule, whether the quality of service information meets a requirement; and if the requirement is met, retaining the delivery executing server unchanged; otherwise, setting another delivery server of the application
(Continued)

as a delivery executing server; and sending a delivery notification to a current delivery executing server of the application upon detecting the delivery notification of the application to be sent.

14 Claims, 3 Drawing Sheets

(51) Int. Cl.
*H04L 12/24* (2006.01)
*H04L 29/06* (2006.01)
*H04L 29/14* (2006.01)
*H04M 15/00* (2006.01)

(52) U.S. Cl.
CPC ............ *H04L 43/087* (2013.01); *H04L 65/80* (2013.01); *H04L 67/1012* (2013.01); *H04L 67/2809* (2013.01); *H04L 67/2819* (2013.01); H04L 43/0823 (2013.01); H04L 43/0858 (2013.01); H04L 43/16 (2013.01); H04L 69/40 (2013.01); H04M 15/8016 (2013.01); H04M 15/83 (2013.01); H04M 15/852 (2013.01); H04M 15/88 (2013.01)

(58) Field of Classification Search
CPC ............ H04L 67/1012; H04L 67/2809; H04L 67/2819; H04L 43/0823; H04L 43/0858; H04L 43/16; H04L 69/40; H04M 15/8016; H04M 15/83; H04M 15/852; H04M 15/88
See application file for complete search history.

(56) References Cited

U.S. PATENT DOCUMENTS

| | | | | |
|---|---|---|---|---|
| 2002/0065922 | A1* | 5/2002 | Shastri | H04L 29/06 709/227 |
| 2010/0098096 | A1* | 4/2010 | Yang | H04L 47/724 370/401 |
| 2011/0225311 | A1* | 9/2011 | Liu | H04L 45/125 709/231 |
| 2014/0071980 | A1* | 3/2014 | Kovalenko | H04M 3/5237 370/352 |
| 2014/0317440 | A1* | 10/2014 | Biermayr | H04L 41/0668 714/4.11 |

FOREIGN PATENT DOCUMENTS

| | | |
|---|---|---|
| CN | 102779132 | 11/2012 |
| JP | 2010231368 | 10/2010 |

\* cited by examiner

METHOD AND APPARATUS FOR SENDING DELIVERY NOTIFICATION OF NETWORK APPLICATION-RELATED PRODUCT

CROSS-REFERENCE TO RELATED APPLICATION

This application is a continuation application of PCT Patent Application No. PCT/CN2014/070592, filed on Jan. 14, 2014, which is based upon and claims the benefit of priority from Chinese Patent Application No. 201310012743.6, filed on Jan. 14, 2013, the entire contents of which are incorporated herein by reference.

TECHNICAL FIELD

The present disclosure relates to the field of Internet technologies, and in particular, to a method and apparatus for sending a delivery notification of a network application-related product.

BACKGROUND

With the rapid development of network technologies, the Internet is gradually becoming an indispensable part of more and more people's lives. With the continuous development of the Internet, a large number of various open network platforms (or referred to as open platforms for short) come out on the Internet, such as an Social Networking Service (SNS) website. A variety of network applications are provided to a user on an open network platform. The user may use a corresponding network service, such as online game, online book, or online video, by using the network applications. A network application may involve some chargeable items, such as chargeable props, books charged by chapter, or videos charged by episode.

When a delivery server is processing a delivery notification, if the delivery server is overloaded or processing logic is faulty, a problem may be caused where the open platform server detects a result of delivery failure and returns a deducted fee to an account despite that the delivery does not fail actually. This is a very serious data error.

SUMMARY

According to various embodiments, there is provided a method and apparatus for sending a delivery notification of a network application-related product. The technical solutions are as follows:

In one aspect, a method for sending a delivery notification of a network application-related product is provided, where a delivery executing server is selected in advance from multiple delivery servers of an application, and the method includes:

acquiring quality of service information of the delivery executing server of the application;

judging, according to a predefined judging rule, whether the quality of service information meets a requirement; and if the requirement is met, retaining the delivery executing server unchanged; otherwise, setting another delivery server of the application as a delivery executing server; and sending a delivery notification to a current delivery executing server of the application upon detecting the delivery notification of the application to be sent.

In another aspect, an apparatus for sending a delivery notification of a network application-related product is provided, including:

a selecting module, configured to select a delivery executing server in advance from multiple delivery servers of an application;

an acquiring module, configured to acquire quality of service information of the delivery executing server of the application;

a judging module, configured to judge, according to a predefined judging rule, whether the quality of service information meets a requirement; and if the requirement is met, retain the delivery executing server unchanged; otherwise, set another delivery server of the application as a delivery executing server; and a sending module, configured to send a delivery notification to a current delivery executing server of the application upon detecting the delivery notification of the application to be sent.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art can derive other accompanying drawings from these accompanying drawings without any creative efforts.

DETAILED DESCRIPTION

To make the objectives, technical solutions, and advantages of the present disclosure clearer, embodiments of the present disclosure are described in detail below with reference to the accompanying drawings.

Figure 1:
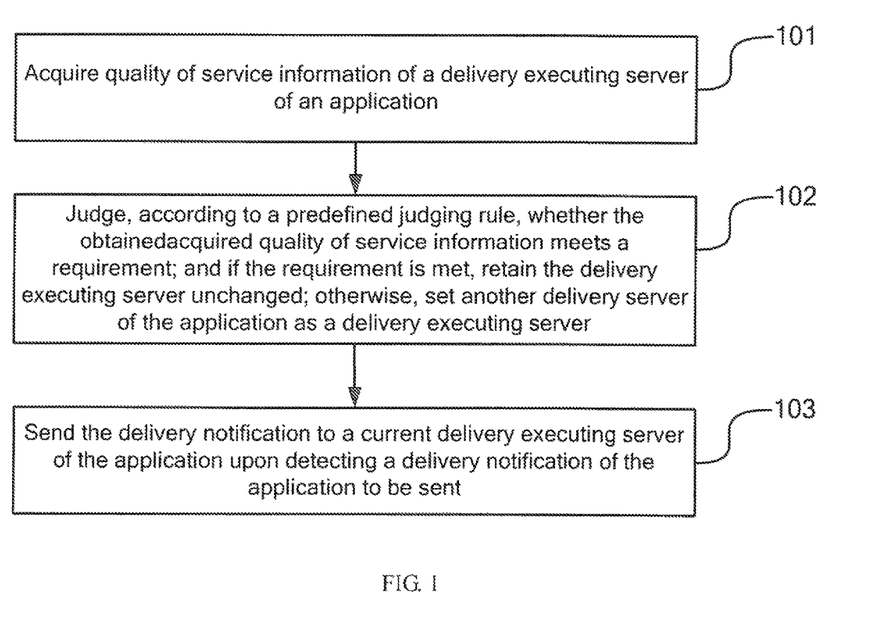
FIG. 1 is a flowchart of a method for sending a delivery notification of a network application-related product according to an embodiment of the present disclosure.

An embodiment of the present disclosure provides a method for sending a delivery notification of a network application-related product, where a delivery executing server is selected in advance from multiple delivery servers of an application. As shown in FIG. 1, the method may include the following steps:

step 101: acquiring quality of service information of the delivery executing server of the application;

step 102: judging, according to a predefined judging rule, whether the acquired quality of service information meets a requirement; and if the requirement is met, retaining the delivery executing server unchanged; otherwise, setting another delivery server of the application as a delivery executing server; and step 103: sending a delivery notification to a current delivery executing server of the application upon detecting the delivery notification of the application to be sent.

In this embodiment of the present disclosure, a delivery executing server is set among multiple delivery servers of an application; a delivery notification of the application is sent to the delivery executing server for processing; and if quality of service of the delivery executing server does not meet a requirement, another delivery server of the application is set as a delivery executing server, thereby reducing data error rate in a delivery process.

An embodiment of the present disclosure provides a method for sending a delivery notification of a network application-related product. Preferably, an executing subject of the method may be an open platform server.

In the method, the open platform server selects a delivery executing server in advance from multiple delivery servers of an application. The application is set with multiple delivery servers, and the open platform server may select one from the multiple delivery servers of the application as the delivery executing server of the application. The delivery executing server may be randomly selected from the delivery servers of the application, or a preferred delivery server may be selected according to related history information. The open platform server sends a delivery notification of the application to the current delivery executing server of the application for processing. Other delivery servers of the application than the delivery executing server may be in an idle state.

The following describes a procedure illustrated in FIG. 1 in detail with reference to a specific implementation manner, where specific contents are as follows:

Step 101: An open platform server acquires quality of service information of a delivery executing server of an application.

Specifically, a trigger event may be set in advance for an operation of acquiring the quality of service information, where the trigger event may be finishing, by the open platform server, sending a delivery notification for a predefined times, or receiving instruction information sent by an administrator by using a system. Preferably, the trigger event may be reaching a predefined first detection period; that is, the operation of acquiring the quality of service information is performed according to the predefined first detection period (for example, one minute).

The quality of service information is information for reflecting quality of processing a delivery notification by a delivery server of an application. The quality of service information may reflect a result that the delivery server itself processes the delivery notification. Such information may be detected by a proxy server in cooperation with the open platform server. The proxy server is an intermediary for the delivery server to communicate with the open platform server. The proxy server and the delivery server are set in one IDC (Internet Data Center). Generally, one IDC is set with multiple proxy servers and multiple delivery servers (which may include delivery servers of different applications), where each proxy server is connected to the open platform server through a public network, and each proxy server may be connected to a plurality of delivery servers through a local area network.

The quality of service information may include at least one of a delivery failure rate, a delivery delay rate, a jitter rate of the delivery failure rate, and the like.

A delivery failure may be regarded as a failure of the delivery server to process the delivery notification. The proxy server may detect a delivery failure of the delivery server in the following manner: the proxy server, after sending a delivery notification to the delivery server, judges that delivery fails if no delivery success notification returned by the delivery server is received after a predefined first time threshold (for example, three seconds); and the proxy server, after sending the delivery notification to the delivery server, judges that the delivery fails if a received reply message contains an application layer protocol error.

A delivery delay indicates feedback delayed too much under a precondition that the delivery does not fail. The proxy server may, after sending the delivery notification to the delivery server, judge that the delivery is delayed if a delivery success notification is received after a predefined second time threshold (for example, 2.5 seconds) but within the first time threshold.

A jitter rate of the delivery failure rate is a parameter used to reflect fluctuation of the delivery failure rate. To calculate the jitter rate of the delivery failure rate, it is required to determine time granularity first, for example, three seconds; then, acquire various delivery failure rates and an average value of the delivery failure rates detected in preceding three seconds. It may be assumed that time granularity for detecting a delivery failure rate is 1 second, delivery failure rates in preceding three seconds are 15%, 20%, and 25% respectively, and an average value is 20%, hence the jitter rate may be $((15\%-20\%)^2+(20\%-20\%)^2+(25\%-20\%)^2)^{1/2}$. A higher jitter rate of the delivery failure rate indicates that the delivery server is more unstable.

Step 102: The open platform server judges, according to a predefined judging rule, whether the acquired quality of service information meets a requirement; and if the requirement is met, retains the delivery executing server unchanged; otherwise, sets another delivery server of the application as a delivery executing server. Generally, the application may have two delivery servers (if the application is divided into multiple login regions, each login region may be set with two delivery servers), hence the other delivery server of the application is a remaining delivery server of the application. If there are at least three delivery servers for the application, when another delivery server of the application is set as a delivery executing server, preferably, one may be selected from the other delivery servers of the application as the delivery executing server.

The judging rule herein may be one judging rule or a combination of multiple judging rules formed in an "and" or "or" manner. For example, one judging rule may be judging that the quality of service information does not meet the requirement if the delivery failure rate is greater than 20%; another judging rule may be judging that the quality of service information does not meet the requirement if the delivery failure rate is greater than 20% or the delivery delay rate is greater than 20%.

Preferably, the following judging rule may be used: if the delivery failure rate is greater than a predefined failure rate threshold, the delivery delay rate is greater than a predefined delay rate threshold, and the jitter rate of the delivery failure rate is greater than a predefined jitter rate threshold, judging that the quality of service information does not meet the requirement; otherwise, judging that the quality of service information meets the requirement. This judging rule is suitable for judging a delivery server state under different conditions by adjusting the thresholds.

In cases where the quality of service information does not meet the requirement, the open platform server, after setting another delivery server as the delivery executing server, may further lock the delivery server whose quality of service information does not meet the requirement for predefined locking duration T, and avoid setting this delivery server as a delivery executing server within the locking duration T. That is, within the duration within which this delivery server is locked, the open platform server sends no delivery notification to this delivery server for processing. If all the multiple delivery servers of the application are in a poor state, a result may be caused where the delivery executing server is switched frequently; however, the frequent switching may be avoided by locking the delivery server whose quality of service information does not meet the requirement.

Preferably, the locking duration may be set to $T=2^n t$, where t is a predefined unit time value (for example, three seconds), n is the number of times that the quality of service information of the delivery server is judged as failing to meet the requirement, and a value of n is reset to zero according to a predefined reset period (for example, 72 hours). Hence, a delivery server in a worse state is locked for longer duration. The setting of resetting to zero may prevent the locking duration from lasting endlessly.

Moreover, a case is possible where a delivery server A is in a poor state within a short period, resulting in that the delivery executing server is switched from the delivery server A to a delivery server B, and the delivery server B always operates as normal where quality of service information never fails to meet the requirement; in such cases, the delivery server A is always in an idle state, and the delivery server B is always in an active state. In order to improve utilization rate of the delivery servers, the following processing may be performed: when duration within which the delivery server is locked reaches T, judging whether this delivery server meets a predefined switchback condition; if the predefined switchback condition is met, setting the delivery server as the delivery executing server of the application (that is, performing switchback); otherwise, retaining the delivery executing server unchanged (that is, performing no switchback).

The switchback condition may be set according to actual specific requirements. Preferably, after the duration within which the delivery server is locked reaches T, a predefined number of delivery notifications of the application may be sent to the delivery server; if a delivery failure rate for processing, by the delivery server, these delivery notifications is not greater than a predefined first failure rate threshold, it may be judged that the delivery server meets the switchback condition; otherwise, it may be judged that the delivery server does not meet the switchback condition. For example, after the locking duration is reached, one delivery notification is sent to the delivery server for processing; if the processing is completed, it may be judged that the delivery server meets the switchback condition; if the processing fails, it may be judged that the delivery server does not meet the switchback condition. The switchback condition may be set as follows: after the duration within which the delivery server is locked reaches T, sending delivery notifications of the application to the delivery server for processing within a predetermined duration; and if a delivery failure rate for processing, by the delivery server, the delivery notifications of the application within the predetermined duration is not greater than a predefined second failure rate threshold, judging that the delivery server meets the predefined switchback condition; otherwise, judging that the delivery server does not meet the predefined switchback condition. For example, after the locking duration is reached, delivery notifications generated within one minute are sent to the delivery server for processing; if the delivery failure rate is not greater than a predetermined second failure threshold (for example, 1%), it may be judged that the delivery server meets the switchback condition; if the processing fails, it may be judged that the delivery server does not meet the switchback condition.

Step 103: The open platform server sends a delivery notification to a current delivery executing server of the application upon detecting the delivery notification of the application to be sent.

Specifically, the open platform server may, upon receiving a payment acknowledgement sent by the terminal, deduct a fee and generate a corresponding delivery notification. When generating the delivery notification, the open platform server may carry an identifier of the delivery executing server in the delivery notification, and then send the delivery notification to the proxy server, so that the proxy server forwards the delivery notification to the corresponding delivery executing server.

The procedure of this embodiment of the present disclosure presents the method for switching a delivery server of an application according to quality of service information. Moreover, this embodiment of the present disclosure further provides a method for switching a proxy server according to a network connection failure rate, which may specifically be as follows: selecting an executing proxy server in advance from proxy servers; acquiring a network connection failure rate of the executing proxy server according to a predefined second detection period; judging whether the acquired network connection failure rate is greater than a predefined network connection failure rate threshold; if the acquired network connection failure rate is greater than the predefined network connection failure rate threshold, setting another proxy server as an executing proxy server; otherwise, retaining the executing proxy server unchanged; and sending, upon detecting a delivery notification of the application to be sent, the delivery notification to the current delivery executing server of the application by using the current executing proxy server.

A network connection failure refers to a communication failure between the proxy server and the open platform server. The open platform server may, after sending the delivery notification to the proxy server, judge that the network connection fails if no feedback information (for example, a delivery success notification, a delivery failure notification, and the like) is received from the proxy server after a predefined third time threshold (for example, 6 seconds).

An operation of selecting the executing proxy server in advance may be performed when the open platform server is powered on. The executing proxy server may be randomly selected from the proxy servers, or a preferred proxy server may be selected according to history network connection failure rate information.

In this embodiment of the present disclosure, a delivery executing server is set among multiple delivery servers of an application; a delivery notification of the application is sent to the delivery executing server for processing; and if quality of service of the delivery executing server does not meet a requirement, another delivery server of the application is set as a delivery executing server, thereby reducing data error rate in a delivery process.

Figure 2:
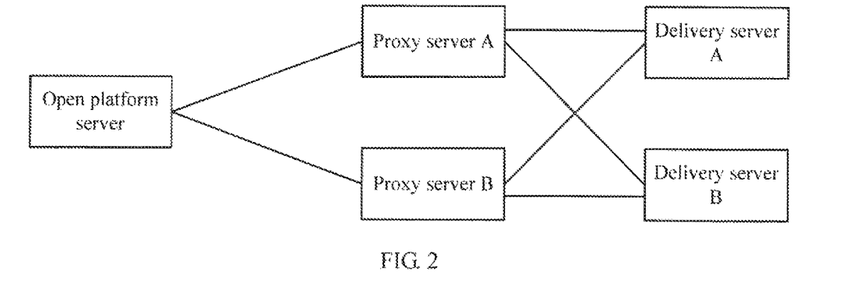
FIG. 2 is an architecture diagram of a system in a method for sending a delivery notification of a network application-related product according to an embodiment of the present disclosure.

A method for sending a delivery notification of a network application-related product provided in an embodiment of the present disclosure is described with reference to a specific implementation scenario. FIG. 2 is an architecture diagram of a system according to this embodiment of the present disclosure.

A proxy server is an intermediary for a delivery server to communicate with an open platform server. Each proxy server is connected to the open platform server through a public network, and each proxy server is connected to all delivery servers through a local area network.

The open platform server communicates with delivery servers by using a selected proxy server, for example, a proxy server A. The proxy server, upon receiving a delivery notification sent by the open platform server, acquires an identifier of a delivery server in the delivery notification, forwards the delivery notification to the delivery server corresponding to the identifier, and judges a processing result, including delivery as normal, delivery failed, delivery delayed, and the like, of a delivery process according to feedback information. The proxy server may inform the open platform server of the processing result; the open platform server collects statistics on the processing result of delivery processes to calculate quality of service information such as a delivery failure rate, a delivery delay rate, and a jitter rate of the delivery failure rate.

Assume that a current delivery executing server is the delivery server A, the open platform server sends delivery notifications to the delivery server A for processing; collects statistics on a processing result; acquires quality of service information of the delivery server A according to a predefined detection period; when the quality of service information of the delivery server A does not meet a requirement, switches the delivery executing server to be a delivery server B and sends subsequent delivery notifications to the delivery server B for processing; and then collects statistics on a processing result; and so on.

In this embodiment of the present disclosure, a delivery executing server is set among multiple delivery servers of an application; a delivery notification of the application is sent to the delivery executing server for processing; and if quality of service of the delivery executing server does not meet a requirement, another delivery server of the application is set as a delivery executing server, thereby reducing data error rate in a delivery process.

Figure 3:
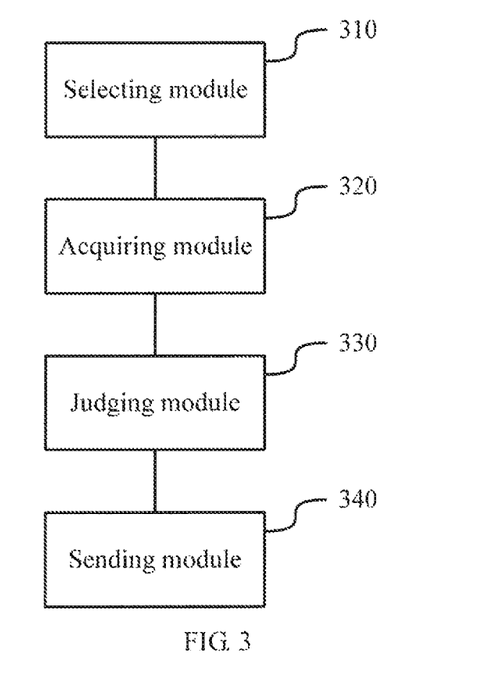
FIG. 3 is a schematic structural diagram of an apparatus for sending a delivery notification of a network application-related product according to an embodiment of the present disclosure.

Based on the same technical concept, an embodiment of the present disclosure provides an apparatus for sending a delivery notification of a network application-related product. As shown in FIG. 3, the apparatus includes:

a selecting module 310, configured to select a delivery executing server in advance from multiple delivery servers of an application;

an acquiring module 320, configured to acquire quality of service information of the delivery executing server of the application;

a judging module 330, configured to judge, according to a predefined judging rule, whether the quality of service information meets a requirement; and if the requirement is met, retain the delivery executing server unchanged; otherwise, set another delivery server of the application as a delivery executing server, and a sending module 340, configured to send a delivery notification to a current delivery executing server of the application upon detecting the delivery notification of the application to be sent.

Preferably, the acquiring module 320 is configured to: acquire the quality of service information of the delivery executing server of the application according to a predefined first detection period.

Preferably, the quality of service information includes at least one of a delivery failure rate, a delivery delay rate, and a jitter rate of the delivery failure rate.

Preferably, the judging rule includes: if the delivery failure rate is greater than a predefined failure rate threshold, the delivery delay rate is greater than a predefined delay rate threshold, and the jitter rate of the delivery failure rate is greater than a predefined jitter rate threshold, judging that the quality of service information does not meet the requirement; otherwise, judging that the quality of service information meets the requirement.

Preferably, if the quality of service information does not meet the requirement, the judging module 330, after setting another delivery server of the application as the delivery executing server, is further configured to:

lock the delivery server whose quality of service information does not meet the requirement for predefined locking duration T.

Preferably, the judging module 330 is further configured to:

judge, when duration within which the delivery server is locked reaches T, whether the delivery server meets a predefined switchback condition; and if the switchback condition is met, set the delivery server as the delivery executing server of the application; otherwise, retain the delivery executing server unchanged.

Preferably, the judging module 330 is configured to:

after the duration within which the delivery server is locked reaches, send a predefined number of delivery notifications of the application to the delivery server for processing; and if a delivery failure rate for processing, by the delivery server, the predefined number of delivery notifications of the application is not greater than a predefined first failure rate threshold, judge that the delivery server meets the predefined switchback condition; otherwise, judge that the delivery server does not meet the predefined switchback condition. Preferably, the judging module 330 is configured to:

after the duration within which the delivery server is locked reaches T, send delivery notifications of the application to the delivery server for processing within a predetermined duration; and if a delivery failure rate for processing, by the delivery server, the delivery notifications of the application within the predetermined duration is not greater than a predefined second failure rate threshold, judge that the delivery server meets the predefined switchback condition; otherwise, judge that the delivery server does not meet the predefined switchback condition.

Preferably, the locking duration $T=2^n t$, where t is a predefined unit time value, n is the number of times that the quality of service information of the delivery server is judged as failing to meet the requirement, and a value of n is reset to zero according to a predefined reset period.

Preferably, the apparatus further includes a proxy switching module, configured to select an executing proxy server in advance from proxy servers; obtain, according to a predefined second detection period, a network connection failure rate of the executing proxy server; judge whether the network connection failure rate is greater than a predefined network connection failure rate threshold; and if the network connection failure rate is greater than the predefined network connection failure rate threshold, set another proxy server as an executing proxy server; otherwise, retain the executing proxy server unchanged; and the sending module 340 is configured to send, upon detecting a delivery notification of the application to be sent, the delivery notification to the current delivery executing server of the application by using the current executing proxy server.

In this embodiment of the present disclosure, a delivery executing server is set among multiple delivery servers of an application; a delivery notification of the application is sent to the delivery executing server for processing; and if quality of service of the delivery executing server does not meet a requirement, another delivery server of the application is set as a delivery executing server, thereby reducing data error rate in a delivery process.

Figure 4:
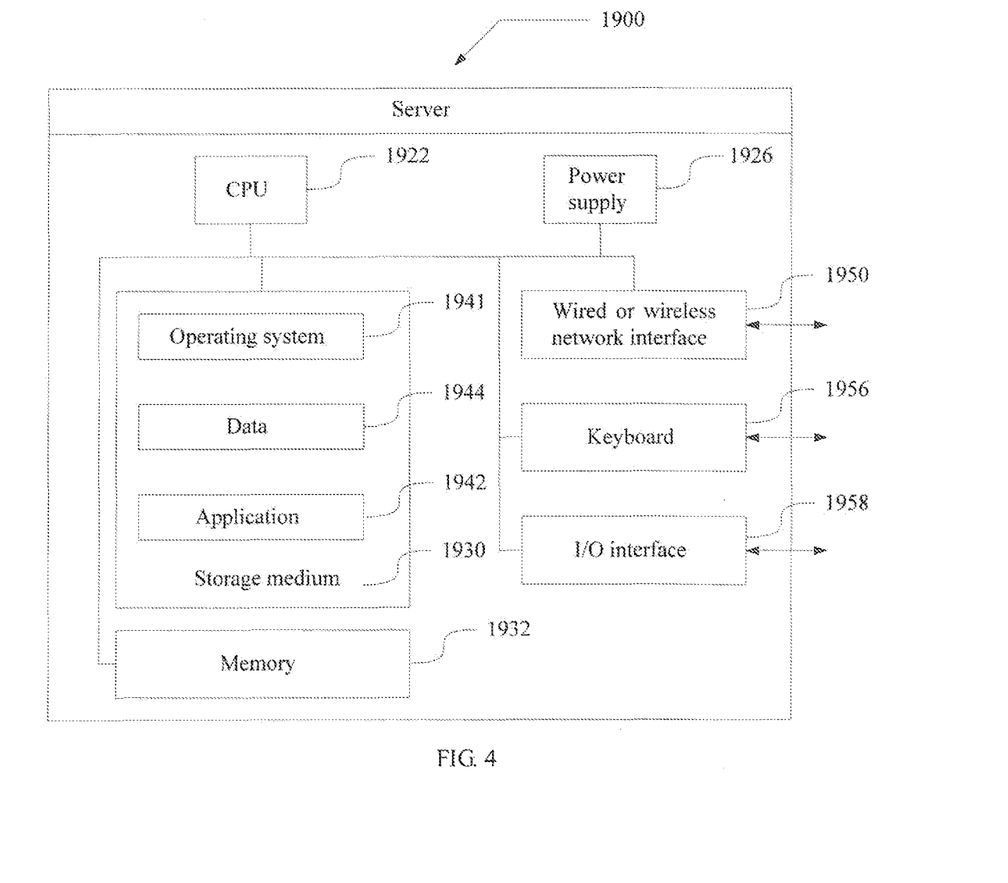
FIG. 4 is a schematic structural diagram of an open platform server according to an embodiment of the present disclosure.

FIG. 4 is a schematic structural diagram of a server according to an embodiment of the present disclosure (the server may serve as the open platform server). The server 1900 may function differently depending on configuration or performance, and may include at least one central processing unit (CPU) 1922 (for example, at least one processor), a memory 1932, at least one storage medium 1930 (for example, at least one mass storage device) for storing an application 1942 or data 1944. The memory 1932 and the non-transitory storage medium 1930 may be used for non-transitory storage or permanent storage. Programs stored in the storage medium 1930 may include at least one module (now shown in the drawing), where each module may include a series of operation instructions to be executed on the server. Further, the CPU 1922 may be set as communicating with the storage medium 1930, and executing the operation instructions included in the storage medium 1930 on the server 1900.

The server 1900 may further include at least one power supply 1926, at least one wired or wireless network interface 1950, at least one input/output interface 1958, at least one keyboard 1956, and/or at least one operating system 1941, for example, Windows Server™, Mac OS X™, Unix™, Linux™, FreeBSD™, and the like.

The server 1900 may include a memory and at least one program, where the at least one program is stored in the memory, and is configured to be executed by at least one processor. The at least one program includes instructions for performing the following operations:

acquiring quality of service information of the delivery executing server of the application;

judging, according to a predefined judging rule, whether the quality of service information meets a requirement; and if the requirement is met, retaining the delivery executing server unchanged; otherwise, setting another delivery server of the application as a delivery executing server; and sending a delivery notification to a current delivery executing server of the application upon detecting the delivery notification of the application to be sent.

Preferably, the acquiring quality of service information of a delivery executing server of an application includes:

acquire the quality of service information of the delivery executing server of the application according to a predefined first detection period.

Preferably, the quality of service information includes at least one of a delivery failure rate, a delivery delay rate, and a jitter rate of the delivery failure rate.

Preferably, the judging rule includes: if the delivery failure rate is greater than a predefined failure rate threshold, the delivery delay rate is greater than a predefined delay rate threshold, and the jitter rate of the delivery failure rate is greater than a predefined jitter rate threshold, judging that the quality of service information does not meet the requirement; otherwise, judging that the quality of service information meets the requirement.

Preferably, if the quality of service information does not meet the requirement, after setting another delivery server of the application as the delivery executing server, the following operation is performed:

locking the delivery server whose quality of service information does not meet the requirement for predefined locking duration T.

Preferably, the following operation is performed:

judging, when duration within which the delivery server is locked reaches T, whether the delivery server meets a predefined switchback condition; and if the switchback condition is met, setting the delivery server as the delivery executing server of the application; otherwise, retaining the delivery executing server unchanged.

Preferably, the judging, when duration within which the delivery server is locked reaches T, whether the delivery server meets a predefined switchback condition includes:

after the duration within which the delivery server is locked reaches T, sending a predefined number of delivery notifications of the application to the delivery server for processing; and if a delivery failure rate for processing, by the delivery server, the predefined number of delivery notifications of the application is not greater than a predefined third failure rate threshold, judging that the delivery server meets the predefined switchback condition; otherwise, judging that the delivery server does not meet the predefined switchback condition.

Preferably, the judging, when duration within which the delivery server is locked reaches T, whether the delivery server meets a predefined switchback condition includes:

after the duration within which the delivery server is locked reaches T, sending delivery notifications of the application to the delivery server for processing within a predetermined duration; and if a delivery failure rate for processing, by the delivery server, the delivery notifications of the application within the predetermined duration is not greater than a predefined second failure rate threshold, judging that the delivery server meets the predefined switchback condition; otherwise, judging that the delivery server does not meet the predefined switchback condition.

Preferably, the at least one program further includes instructions for performing the following operations: selecting an executing proxy server in advance from proxy servers; obtaining, according to a predefined second detection period, a network connection failure rate of the executing proxy server; judging whether the network connection failure rate is greater than a predefined network connection failure rate threshold; and if the network connection failure rate is greater than the predefined network connection failure rate threshold, setting another proxy server as an executing proxy server; otherwise, retaining the executing proxy server unchanged; and the sending a delivery notification to a current delivery executing server of the application upon detecting the delivery notification of the application to be sent comprises: sending, upon detecting the delivery notification of the application to be sent, the delivery notification to the current delivery executing server of the application by using a current executing proxy server.

In this embodiment of the present disclosure, a delivery executing server is set among multiple delivery servers of an application; a delivery notification of the application is sent to the delivery executing server for processing; and if quality of service of the delivery executing server does not meet a requirement, another delivery server of the application is set as a delivery executing server, thereby reducing data error rate in a delivery process.

It should be noted that, when the apparatus for sending a delivery notification of a network application-related product provided in this embodiment sends a delivery notification, the division of the functional modules are described as an example. In actual application, the functions may be performed by different functional modules according to actual requirements. That is, the internal structure of the apparatus is divided into different functional modules to implement all or a part of functions described above. Furthermore, the apparatus for sending a delivery notification of a network application-related product provided in this embodiment is based on the same inventive concept as the method for sending a delivery notification of a network application-related product. Therefore, the detailed implementation can refer to the description of the method embodiments of the present disclosure, which is not described herein any further.

The sequence numbers of the preceding embodiments of the present invention are only for ease of description, but do not denote the preference of the embodiments.

A person skilled in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for sending a delivery notification of a network application-related product, wherein a first delivery server is selected in advance from multiple delivery servers of an application as a delivery executing server, and the method comprises:
    acquiring quality of service information of the first delivery server of the application;
    judging, according to a predefined judging rule, whether the quality of service information meets a requirement; and if the requirement is met, retaining the first delivery server as a current delivery executing server; otherwise, setting a second delivery server of the application as the current delivery executing server to replace the first delivery server thereby reducing data, error rate in a delivery process; and
    sending a delivery notification to the current delivery executing server of the application upon detecting the delivery notification of the application to be sent;
    wherein the quality of service information comprises at least one of a delivery failure rate, a delivery delay rate, and a jitter rate of the delivery failure rate;
    the judging rule comprises: if the delivery failure rate is greater than a predefined failure rate threshold, the delivery delay rate is greater than a predefined delay rate threshold, and the jitter rate of the delivery failure rate is greater than a predefined jitter rate threshold, judging that the quality of service information does not meet the requirement; otherwise, judging that the quality of service information meets the requirement.

2. The method according to claim 1, wherein the acquiring quality of service information of the first delivery server of the application comprises:
    acquiring the quality of service information of the first delivery server of the application according to a predefined first detection period.

3. The method according to claim 1, wherein if the quality of service information does not meet the requirement, after the setting a second delivery server of the application as the current delivery executing server to replace the first delivery server, the method further comprises:
    locking the first delivery server whose quality of service information does not meet the requirement for predefined locking duration T.

4. The method according to claim 3, further comprising:
    judging, when duration within which the first delivery server is locked reaches T, whether the first delivery server meets a predefined switchback condition; and if the switchback condition is met, setting the first delivery server as the current delivery executing server of the to replace the second delivery server application; otherwise, retaining the second delivery server as the current delivery executing server.

5. The method according to claim 4, wherein the judging, when duration within which the first delivery server is locked reaches T, whether the first delivery server meets a predefined switchback condition comprises:
    after the duration within which the first delivery server is locked reaches T, sending a predefined number of delivery notifications of the application to the first delivery server for processing; and if a delivery failure rate for processing, by the first delivery server, the predefined number of delivery notifications of the application is not greater than a predefined first failure rate threshold, judging that the first delivery server meets the predefined switchback condition; otherwise, judging that the delivery server does not meet the predefined switchback condition.

6. The method according to claim 4, wherein the judging, when duration within which the first delivery server is locked reaches T, whether the first delivery server meets a predefined switchback condition comprises:
    after the duration within which the first delivery server is locked reaches T, sending delivery notifications of the application to the first delivery server for processing within a predetermined duration; and if a delivery failure rate for processing, by the first delivery server, the delivery notifications of the application within the predetermined duration is not greater than a predefined second failure rate threshold, judging that the first delivery server meets the predefined switchback condition; otherwise, judging that the first delivery server does not meet the predefined switchback condition.

7. The method according to claim 1, further comprising: selecting an executing proxy server in advance from proxy servers; acquiring, according to a predefined second detection period, a network connection failure rate of the executing proxy server; judging whether the network connection failure rate is greater than a predefined network connection failure rate threshold; and if the network connection failure rate is greater than the predefined network connection failure rate threshold, setting another proxy server as an executing proxy server; otherwise, retaining the executing proxy server unchanged; and
    the sending a delivery notification to the current delivery executing server of the application upon detecting the delivery notification of the application to be sent comprises: sending, upon detecting the delivery notification of the application to be sent, the delivery notification to the current delivery executing server of the application by using a current executing proxy server.

8. An apparatus for sending a delivery notification of a network application-related product, comprising:
    one or more processors; and
    a non-transitory computer-readable storage medium storing instructions that, when executed by the one or more processors, cause the one or more processors to perform operations comprising:

selecting a first delivery server in advance from multiple delivery servers of an application as a delivery executing server;

acquiring quality of service information of the first delivery server of the application;

judging, according to a predefined judging rule, whether the quality of service information meets a requirement; and if the requirement is met, retaining the first delivery server as a current delivery executing server unchanged; otherwise, setting a second delivery server of the application as the current delivery executing server thereby reducing data error rate in a delivery process; and sending a delivery notification to the current delivery executing server of the application upon detecting the delivery notification of the application to be sent;

wherein the quality of service information comprises at least one of a delivery failure rate, a delivery delay rate, and a jitter rate of the delivery failure rate;

the judging rule comprises: if the delivery failure rate is greater than a predefined failure rate threshold, the delivery delay rate is greater than a predefined delay rate threshold, and the jitter rate of the, delivery failure rate is greater than a predefined jitter rate threshold, judging that the quality of service information does not meet the requirement; otherwise, judging that the quality of service information meets the requirement.

9. The apparatus according to claim 8, wherein the acquiring quality of service information of the first delivery server of the application comprises acquiring the quality of service information of the first delivery server of the application according to a predefined first detection period.

10. The apparatus according to claim 8, wherein the operations further comprise:

after setting a second delivery server of the application as the current delivery executing server to replace the first delivery server, locking the first delivery server whose quality of service information does not meet the requirement for predefined locking duration T.

11. The apparatus according to claim 10, wherein the operations further comprise:

judging, when duration within which the first delivery server is locked reaches T, whether the first delivery server meets a predefined switchback condition; and if the switchback condition is met, setting the first delivery server as the current delivery executing server of the application to replace the second delivery server; otherwise, retaining the second delivery server as the current delivery executing server.

12. The apparatus according to claim 11, wherein the judging, when duration within which the first delivery server is locked reaches T, whether the first delivery server meets a predefined switchback condition comprises:

after the duration within which the first delivery server is locked reaches T, sending a predefined number of delivery notifications of the application to the first delivery server for processing; and if a delivery failure rate for processing, by the first delivery server, the predefined number of delivery notifications of the application is not greater than a predefined first failure rate threshold, judging that the first delivery server meets the predefined switchback condition; otherwise, judging that the first delivery server does not meet the predefined switchback condition.

13. The apparatus according to claim 11, wherein the judging, when duration within which the first delivery server is locked reaches T, whether the first delivery server meets a predefined switchback condition comprises:

after the duration within which the first delivery server is locked reaches T, sending delivery notifications of the application to the first delivery server for processing within a predetermined duration; and if a delivery failure rate for processing, by the first delivery server, the delivery notifications of the application within the predetermined duration is not greater than a predefined second failure rate threshold, judging that the first delivery server meets the predefined switchback condition; otherwise, judging that the first delivery server does not meet the predefined switchback condition.

14. The apparatus according to claim 8, wherein, the operations further comprise:

selecting an executing proxy server in advance from proxy servers; obtaining, according to a predefined second detection period, a network connection failure rate of the executing proxy server; judging whether the network connection failure rate is greater than a predefined network connection failure rate threshold; and if the network connection failure rate is greater than the predefined network connection failure rate threshold, setting another proxy server as an executing proxy server; otherwise, retaining the executing proxy server unchanged; and the sending a delivery notification to the current delivery executing server of the application upon detecting the delivery notification of the application to be sent comprises:

sending, upon detecting a delivery notification of the application to be sent, the delivery notification to the current delivery executing server of the application by using the current executing proxy server.

* * * * *